Oct. 16, 1962  D. J. FREIMAN  3,058,768
HANDLE ASSEMBLY
Filed Aug. 2, 1960
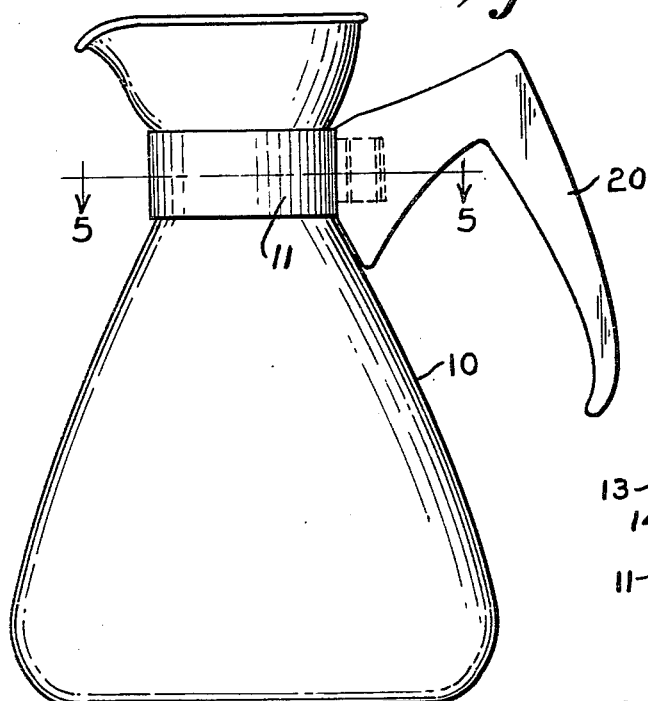
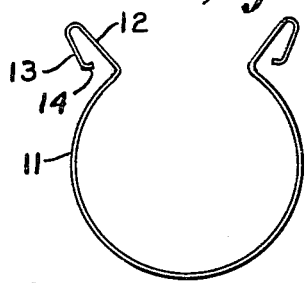
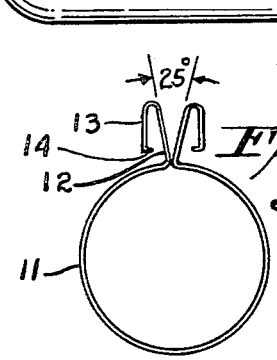
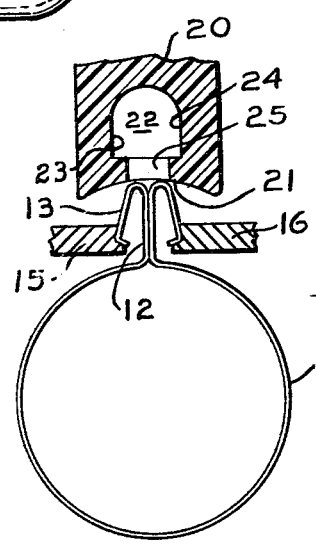
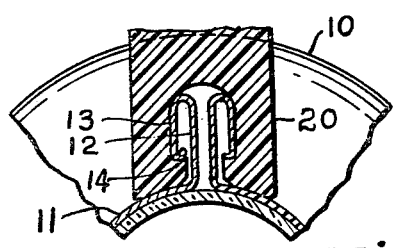
INVENTOR.
DAVID J. FREIMAN
BY Clarence R. Patty Jr
ATTORNEY

United States Patent Office 3,058,768
Patented Oct. 16, 1962

3,058,768
HANDLE ASSEMBLY
David J. Freiman, Corning, N.Y., assignor to Corning Glass Works, Corning, N.Y., a corporation of New York
Filed Aug. 2, 1960, Ser. No. 47,020
3 Claims. (Cl. 294—31.2)

The present invention relates to utensil assemblies most commonly employed for culinary purposes and to a handle and band assembly particularly suitable for use with a utensil or vessel made of vitreous material such as glass or the like, although equally applicable to vessels made of other materials.

The primary object of the invention is to provide a simple and inexpensive band and handle which are attachable permanently to a vessel simply by clamping the band about a vessel and projecting the band ends into a socket provided in the handle.

According to the invention, a utensil clamping band of high strength resilient material, such for example as spring steel, is provided whose free ends are bent to the left and right respectively through angles of approximately 45° along their lines of juncture with a surrounded utensil so as to radially project from the band when closed about a utensil. Each free end is then folded back upon itself about a small radius through an angle of approximately 160°. The extreme marginal portion of the free ends are then bent through an angle of approximately 45° to the left and right respectively so that each free end edge faces, but is substantially spaced from, the plain flat surface of such end.

For cooperative use with the band and a utensil, a handle is provided having a wall with a surface facing the utensil contoured to fit against the circular surface of the band surrounding it. The handle is provided with a pocket having an entrance passage of rectangular configuration through such wall with its long dimension vertical. By use of a fixture, the band ends may be brought together and started into such pocket passage. As soon as the folded portions of the band ends clear the passage wall they expand and force their extreme marginal portions to glide along the wall surface facing away from the utensil into engagement with the pocket side walls to permanently lock the handle band and utensil into rigid relationship with one another.

For a more detailed description of the invention reference will hereinafter be made to the accompanying drawing in which:

FIG. 1 is a side elevational view of a utensil embodying the invention.

FIG. 2 is a top plan view of a band embodying the invention before being bound about a utensil.

FIG. 3 is a view similar to FIG. 2, but with the band closed.

FIG. 4 is a view, on an enlarged scale, showing the band being held preparatory to the introduction of its ends into the handle, a fragment of which is shown in section.

FIG. 5 is a view, on an enlarged scale, taken on line 5—5 of FIG. 1.

Referring to the drawing in detail, a utensil 10 is provided with a generally circular band 11 having oppositely disposed ends each comprising a portion such as 12 bent outward approximately 45° along its line of juncture with its circular portion. Extending from portion 12 a further portion 13 is then folded back on portion 12 approximately 160°. An extreme end portion 14 is bent approximately normal to portion 13 with the end edge of portion 14 facing the plain flat surface of portion 12.

Normally the band 11 is tensioned to the open position shown in FIG. 2. With the band closed as indicated in FIG. 3 the included angle between the portions such as 12 is approximately 25°. To introduce the two band end portions such as 12—14 into the pocket entrance of a handle such portions are gripped between suitable jaws 15 and 16 of a jig to squeeze them together and hold them about a utensil neck in the positions shown in FIG. 4, with the portions such as 12 and 13 almost parallel to one another, thus reducing their overall width to the width of the entrance passage to a handle pocket to be described.

The handle 20 embodies an arcuate surfaced wall portion 21 for abutment against the circular portion of the band in the regions on either side of its portions such as 12. Wall portion 21 contains a vertical slot or entrance passage 25 into a pocket 22 having side walls 23 and 24 each laterally spaced from the slot entrance a sufficient distance to accommodate portions such as 12—14 when portions 12 and 13 are substantially parallel to one another, as shown in FIG. 5.

In the assembly of the band the handle with a utensil, such as 10 for example, the band 11 is held wrapped about the utensil neck by jaws 15 and 16. Under these circumstances, as previously pointed out, the band portions such as 12—14 are in the position shown in FIG. 4 so that such portions may be at least partly introduced into the entrance of slot 25 and the jaws 15 and 16 removed from association with such ends. Thereafter the band is pressed to its home position in the pocket with its surface 21 in engagement with the band. This just nicely brings the portions 12—14 fully within the handle pocket whereupon the portions such as 12 and 13 separate from one another under their residual tension, the portions such as 13 tightly pressing against the side walls 23 and 24 tending to hold the utensil neck and the handle drawn tightly against the circular portion of the band. As will be appreciated, any separation of the band ends tending to loosen the band from the utensil neck is counteracted by the tendency of the band ends to return to the positions shown in FIG. 3.

As will be appreciated from the foregoing, the arrangement makes a particularly permanently rigid coupling between the respective parts without any possibility of there being any loss of such rigidity in use.

What is claimed is:

1. In a utensil handle and band assembly, a resilient vessel encircling band having ends folded back upon themselves and a handle having a pocket therein for said band ends bordered by sidewalls comprising surfaces of the handle, such sidewalls being so spaced as to retain the folded ends of such bands constrained in a position to maintain tension on the band about a utensil surrounded thereby, said handle having a wall facing the band containing an entrance to such pocket for the band ends and having oppositely facing inner surfaces engaged thereby to prevent their withdrawal from such pocket.

2. In a utensil handle and band assembly, a resilient vessel encircling band having ends each having a portion folded back upon itself, and a handle having walls defining the lateral borders of a pocket therein for the occupancy by the ends of said band between which they are constrained to maintain the band tightly wrapped around the utensil, said handle having a wall facing said band containing an entrance to such pocket and whose oppositely facing inner surfaces are engaged by such free ends of the bent portions to prevent withdrawal of the band ends from the pocket.

3. In a utensil handle and band assembly, a resilient vessel encircling band having ends folded back upon themselves and a handle having a pocket therein for said band ends bordered by sidewalls comprising surfaces of the handle, such sidewalls being so spaced as to retain the folded ends of such bands constrained to positions parallel to one another and in which they maintain tension on the band about a utensil surrounded thereby, said handle having a wall facing the band containing an entrance to such pocket for the band ends and having oppositely facing inner surfaces engaged thereby to prevent their withdrawal from such pocket.

References Cited in the file of this patent
UNITED STATES PATENTS

| | | |
|---|---|---|
| 1,737,375 | King | Nov. 26, 1929 |
| 2,428,942 | Poglein | Oct. 14, 1947 |
| 2,991,111 | Freiman | July 4, 1961 |